United States Patent
Ireland et al.

(10) Patent No.: US 10,776,255 B1
(45) Date of Patent: Sep. 15, 2020

(54) AUTOMATIC VERIFICATION OF OPTIMIZATION OF HIGH LEVEL CONSTRUCTS USING TEST VECTORS

(71) Applicant: INTERNATIONAL BUSINESS MACHINES CORPORATION, Armonk, NY (US)

(72) Inventors: Iain Alexander Ireland, North York (CA); Reid Copeland, Richmond Hill (CA); Allan H. Kielstra, Ajax (CA); David Siegwart, Eastleigh (GB); Toshihiko Koju, Chiba (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/527,362

(22) Filed: Jul. 31, 2019

(51) Int. Cl.
  *G06F 9/44* (2018.01)
  *G06F 11/36* (2006.01)
  *G06F 8/41* (2018.01)

(52) U.S. Cl.
  CPC .......... *G06F 11/3688* (2013.01); *G06F 8/443* (2013.01); *G06F 11/3684* (2013.01); *G06F 11/3692* (2013.01)

(58) Field of Classification Search
  None
  See application file for complete search history.

(56) References Cited

U.S. PATENT DOCUMENTS

| | | | |
|---|---|---|---|
| 9,563,536 B1 * | 2/2017 | Cooper | G06F 11/3612 |
| 9,569,347 B2 | 2/2017 | Koju | |
| 9,715,377 B1 | 7/2017 | Bradbury | |
| 2006/0031820 A1 * | 2/2006 | Li | G06F 8/51 717/137 |
| 2006/0114132 A1 * | 6/2006 | Zhang | G06F 9/45516 341/50 |
| 2011/0231824 A1 * | 9/2011 | Chabbi | G06F 11/0751 717/126 |
| 2015/0370695 A1 * | 12/2015 | Koju | G06F 8/52 717/126 |
| 2016/0154635 A1 * | 6/2016 | Koju | G06F 8/443 717/151 |
| 2018/0285101 A1 * | 10/2018 | Yahav | G06F 8/53 |
| 2019/0227779 A1 * | 7/2019 | Jaeger | G06F 8/47 |

\* cited by examiner

*Primary Examiner* — Insun Kang
(74) *Attorney, Agent, or Firm* — Cantor Colburn LLP; Peter Wang (57) ABSTRACT

A method for automatic verification of optimization of high level constructs includes generating a first executable code by compiling a computer program that includes a high level construct. The compiling includes generating a first set of machine instructions for the high level construct and storing compile-time information for the high level construct. The method further includes optimizing the first executable code which includes converting the first executable code into an intermediate language representation. The optimization further includes generating a second executable code. For this, the method includes generating a second set of machine instructions for the high level construct from the intermediate language representation. If the behavior of the first set of machine instructions and the second set of machine instructions matches, the second set of machine instructions is included in the second executable code, otherwise the first set of machine instructions is included.

25 Claims, 6 Drawing Sheets

AUTOMATIC VERIFICATION OF OPTIMIZATION OF HIGH LEVEL CONSTRUCTS USING TEST VECTORS

BACKGROUND

The present disclosure generally relates to computing technology, and more particularly to methods, computer program products and data processing systems for improving the performance of executable program code.

Computer software includes a set of instructions to be executed by a data processing system. Computer software provides instructions that enable a data processing system to function as, for example, a word processing device, spreadsheet device, or an Internet browsing device, a data repository, etc. There are a wide variety of different data processing systems capable of using computer software. Accordingly, as used herein, the term "data processing system" is intended to have a broad meaning, and may include personal computers, laptop computers, palmtop computers, handheld computers, network computers, servers, mainframes, workstations, cellular telephones and similar wireless devices, personal digital assistants and other electronic devices on which computer software may be installed. The terms "computer", "computer software", "computer program", "computer programming", "software", "software program" and related terms are intended to have a similarly broad meaning.

Generally, modern computer software is originally written in a "high level" computer programming language using syntactic constructs that are comprehensible by a programmer to represent the instructions embodied in the software. High level computer programming languages are useful because their syntactic constructs make it easier for programmers to create computer software, since they do not need to compose instructions in a language that would be directly understood by the data processing system. Writing instructions in such a language would be far more difficult because such languages bear little or no resemblance to any human language.

Instructions written in a high level computer programming language, however, generally cannot be directly understood and implemented by a data processing system. Therefore, before a computer program written in a high level computer programming language may be used by a data processing system, it is first "compiled" into language that will be understood by the target data processing system. Compiling is a process, usually carried out by a computer program called a "compiler", in which the syntactic constructs of the high level computer programming language are in essence translated into instructions in a language that will be understood by the target data processing system (possibly through an intermediate software layer). The result of the "compiling" or "compilation" process is known as "executable code" or "binary code", meaning computer program code that can be executed by the data processing system either directly or by an intermediate software layer, and the instructions that will be understood by the target data processing system are denoted "machine" instructions.

High level computer programming languages may be viewed as falling within one of two broad types: statically compiled languages, and dynamically compiled languages. In statically compiled languages, the compilation process is carried out a single time before any code is executed, and the result of the compilation is executable code that can be implemented directly by the data processing system without any intermediate software layer. Statically compiled languages include C, C++, FORTRAN, PL/I, COBOL and Ada. In dynamically compiled languages, such as Java™, the source code is first compiled into an intermediate form that can be implemented by an intermediate software layer, such as a Java virtual machine (JVM). In Java, this intermediate form is known as "bytecode". Typically, but not necessarily, the intermediate software layer will carry out additional compilation each time the computer program is run, usually to translate the intermediate form of the source code into executable code that can be directly executed by the data processing system.

SUMMARY

According to one or more embodiments of the present invention, a computer-implemented method for automatic verification of optimization of high level constructs, includes generating, by a compiler, a first executable code by compiling a computer program. The computer program includes a high level construct, and the compiling includes generating a first set of machine instructions for the high level construct, and storing, in the first executable code, compile-time information for the high level construct. The method further includes optimizing, by a binary optimizer, the first executable code. The optimizing includes converting the first executable code into an intermediate language (IL) representation of the computer program. The IL representation includes a set of IL instructions corresponding to the high level construct based on the compile-time information. The optimizing further includes generating a second executable code based on the IL representation of the computer program, wherein generating the second executable code includes generating a second set of machine instructions for the high level construct based on the IL representation of the high level construct. Based on a determination that the first set of machine instructions and the second set of machine instructions match in behavior, the second set of machine instructions is included in the second executable code. Alternatively, based on a determination that the first set of machine instructions and the second set of machine instructions do not match in behavior, the first set of machine instructions is included in the second executable code.

In one or more examples, the determination that the first set of machine instructions and the second set of machine instructions match in the behavior is based on a satisfiability solver. Determining that the first set of machine instructions and the second set of machine instructions match in the behavior includes generating a test vector that comprises a plurality of tests, executing each test in the test vector for the first set of machine instructions and the second set of machine instructions associated with the high level construct. The determining further includes comparing outputs of the each test in the test vector, wherein the behavior is determined to match based on each of the outputs matching for the first set of machine instructions and the second set of machine instructions.

Executing a test in the test vector includes creating a first wrapper function for the first set of machine instructions and, executing the first wrapper function with inputs according to the test to be executed, and collecting a first set of outputs. Further, executing the test includes creating a second wrapper function for the second set of machine instructions, and executing the second wrapper function with the inputs according to the test to be executed. Executing the test further includes collecting a second set of outputs. In one or more examples, the first wrapper function is enclosed in a first exception handler, and the second wrapper function is enclosed in a second exception handler. In one or more examples, the behavior is determined to match based on a first output of a test being an exception for the first set of machine instructions and a second output of said test being said exception for the second set of machine instructions.

In one or more examples, the storing compile-time information for the high level construct, includes storing inputs to said test corresponding to the high level construct.

In one or more examples, the compile-time information includes an identity of the high level construct, location(s) of the first set of machine instructions, location(s) of the inputs and outputs for the first set of machine instructions.

In one or more examples, the first compiler is a first instance of a compiler and a second instance of said compiler with different settings from those of the first compiler is used for generating the second executable code.

According to one or more embodiments of the present invention, a method for automatic verification of optimization of high level constructs includes generating, by a compiler, a first executable code by compiling a computer program, the computer program including a high level construct. The compiling includes generating a first set of machine instructions for the high level construct, and storing, in the first executable code, compile-time information for the high level construct. The method further includes optimizing, by an optimizer, the first executable code. The optimizing includes converting the first executable code into an IL representation of the program, the conversion includes converting the high level construct into an IL representation of it based on the compile-time information. The optimizing includes generating a second executable code based on the IL representation of the program, the second executable code including a second set of machine instructions for the high level construct based on its IL representation. The optimizing further includes based on a determination that the first set of machine instructions and the second set of machine instructions do not match in behavior for a set of inputs, generating a third executable code that includes the first set of machine instruction, the second set of machine instructions, and an added function that checks an input to the high level construct, and in response to the input being from a predetermined set of inputs, causes execution of the first set of machine instructions, and causes execution of the second set of machine instructions otherwise.

In one or more examples, determining that the first set of instructions and the second set of machine instructions match in the behavior includes generating a test vector that comprises a plurality of tests, and executing each test in the test vector for the first set of instructions and the second set of machine instructions associated with the high level construct. The outputs of the each test in the test vector are compared, wherein the behavior is determined to match based on each of the outputs matching for the first set of machine instructions and the second set of instructions. Further, executing a test in the test vector includes creating a first wrapper function for the first set of machine instructions, executing the first wrapper function with inputs according to the test to be executed, and collecting a first set of outputs. Further, executing the test includes creating a second wrapper function for the second set of machine instructions, executing the second wrapper function with the inputs according to the test to be executed, and collecting a second set of outputs.

The above described features can also be provided at least by a system, a computer program product, and a machine.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

One or more embodiments of the present invention can be implemented using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
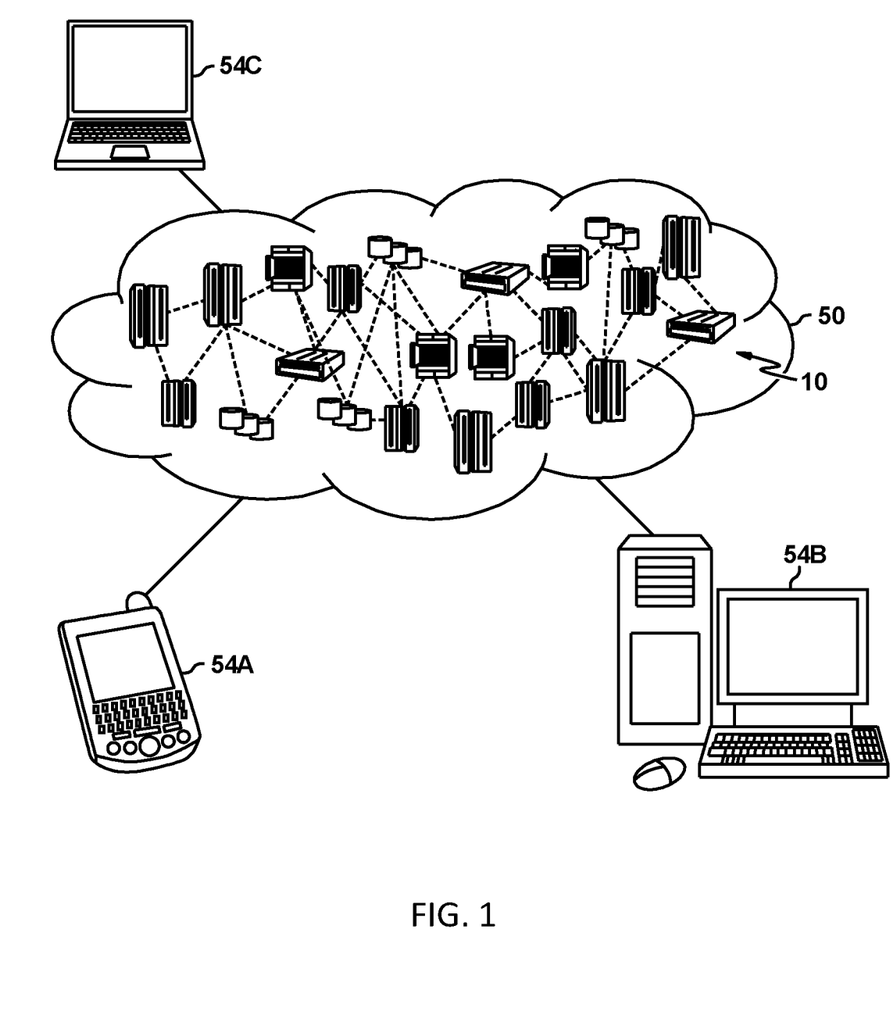
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or some other computer system or device, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54C shown in FIG. 1 are intended to be illustrative only and that computing nodes 10 and cloud computing environment 50 can communicate with any type of computerized device over any type of network and/or network addressable connection (e.g., using a web browser).

Figure 2:
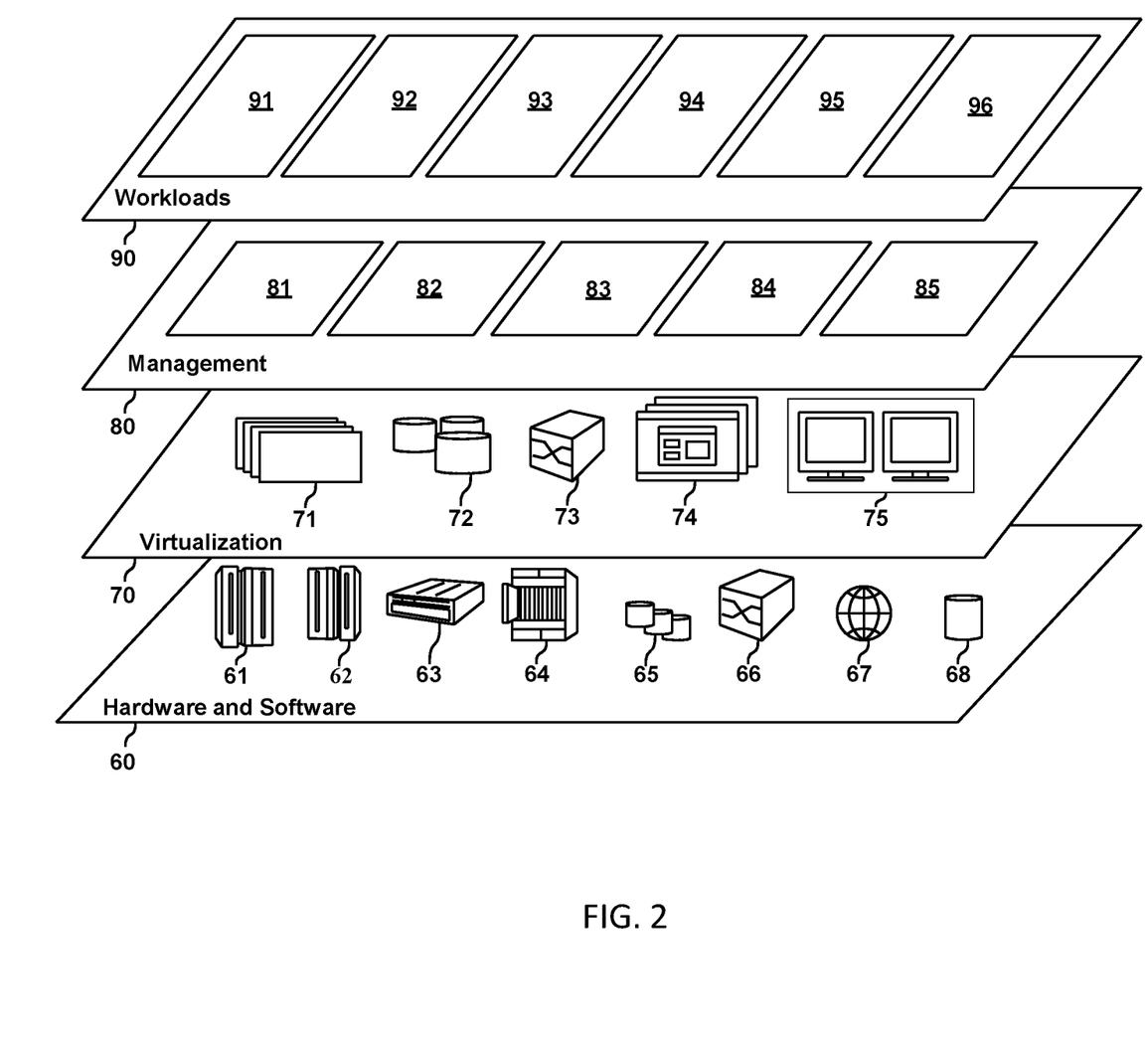
FIG. 2 depicts abstraction model layers of a cloud computer environment according to one or more embodiments of the present invention.

Referring now to FIG. 2, a set of functional abstraction layers provided by cloud computing environment 50 is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61, RISC (Reduced Instruction Set Computer) architecture based servers 62, servers 63, blade servers 64, storage devices 65, and networks and networking components 66. In some embodiments, software components include network application server software 67 and database software 68.

Virtualization layer 70 provides an abstraction layer from which the following examples of virtual entities may be provided: virtual servers 71, virtual storage 72, virtual networks 73, including virtual private networks, virtual applications and operating systems 74, and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91, software development and lifecycle management 92, virtual classroom education delivery 93, data analytics processing 94, transaction processing 95, and learning model processing 96, for performing compilation of high level programming instructions.

Figure 3:
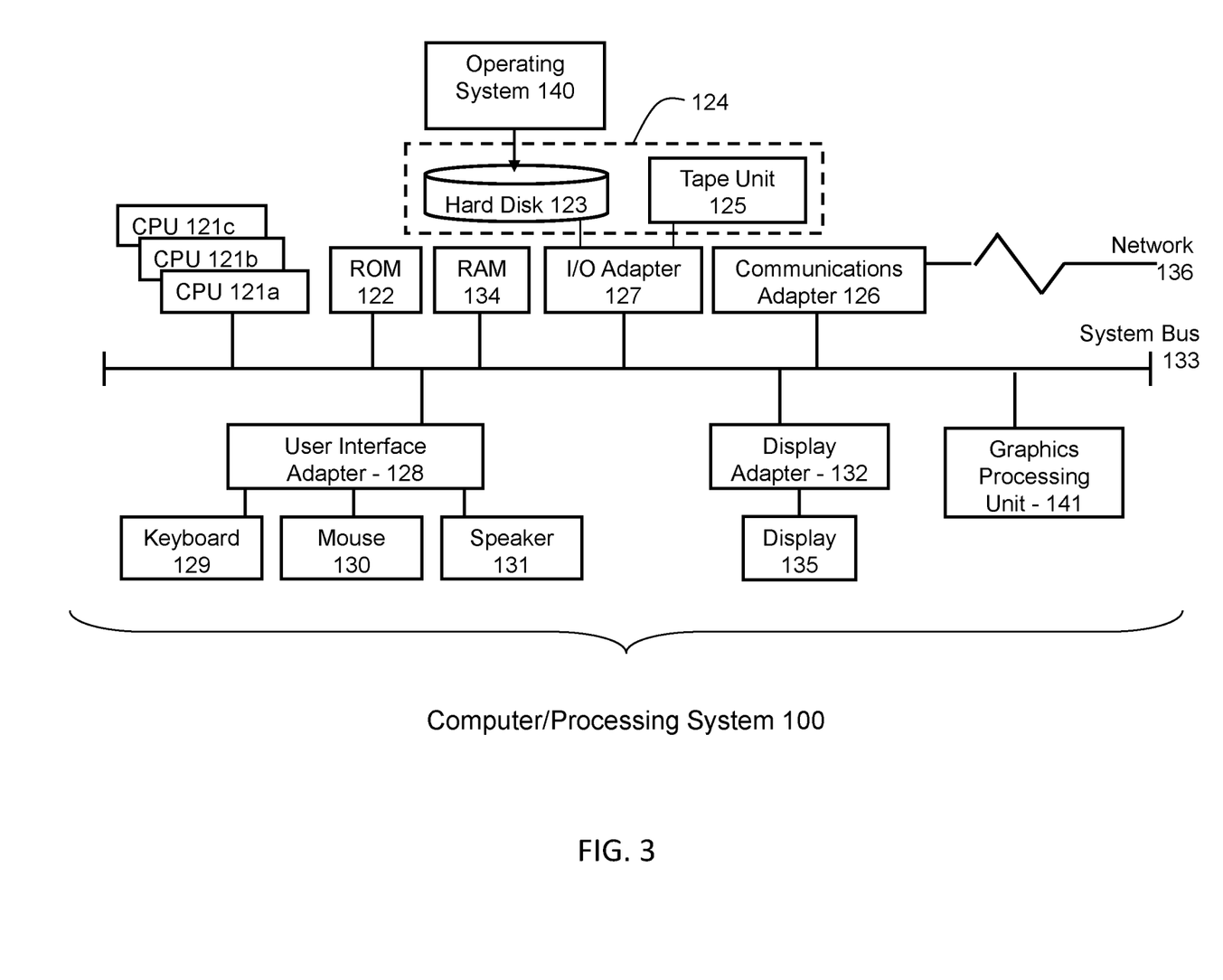
FIG. 3 depicts a block diagram illustrating an exemplary computer processing system that may be utilized to implement one or more embodiments of the present invention.

Referring to FIG. 3, there is shown an embodiment of a data processing system, commonly referred to as a computer system 100, which communicates over a communications network to one or more nodes 10 of the cloud computing environment 50 for implementing the teachings herein. The computer system 100 has one or more central processing units (processors) 121$a$, 121$b$, 121$c$, etc. (collectively or generically referred to as processor(s) 121). In one or more embodiments, each processor 121 may include a reduced instruction set computer (RISC) microprocessor. Processors 121 are coupled to system memory (RAM) 134 and various other components via a system bus 133. Read only memory (ROM) 122 is coupled to the system bus 133 and may include a basic input/output system (BIOS), which controls certain basic functions of computer system 100.

FIG. 3 further depicts an input/output (I/O) adapter 127 and a network adapter 126 coupled to the system bus 133. I/O adapter 127 may be a small computer system interface (SCSI) adapter that communicates with a hard disk 123 and/or tape storage drive 125 or any other similar component. I/O adapter 127, hard disk 123, and tape storage device 125 are collectively referred to herein as mass storage 124. Operating system 140 for execution on the processing system 100 may be stored in mass storage 124. However, the operating system 140 may also be stored in RAM 134 of the computer system 100. Operating systems according to embodiments of the present invention include, for example, UNIX™, Linux™, Microsoft XP™, AIX™ and IBM's i5/OS™.

A network adapter 126 interconnects bus 133 with an outside network 136 enabling the computer system 100 to communicate with other such systems. A screen (e.g., a display monitor) 135 is connected to system bus 133 by display adaptor 132, which may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, which may include, for example, a Super I/O chip integrating multiple device adapters into a single integrated circuit.

In exemplary embodiments, the computer system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 3, the computer system 100 includes processing capability in the form of processors 121, storage capability including RAM 134 and mass storage 124, input means such as keyboard 129 and mouse 130, and output capability including speaker 131 and display 135. In one embodiment, a portion of RAM 134 and mass storage 124 collectively store the operating system to coordinate the functions of the various components shown in FIG. 3.

As described herein, in case of statically compiled programs, a computer program is compiled before any the resulting executable code is executed. With statically compiled languages, a technical problem is that at the time the computer program is compiled, a compiler program does not possess any of the information that can only be gathered at runtime (that is, when the computer program is executed), and which information can have a substantial impact on the efficiency of the computer program. An additional technical problem is that the compiler program may not be aware of the particular data processing system on which the resulting executable code will be executed, and is therefore unable to adapt the executable code to the hardware features of the data processing system on which it will run. To address such technical problems, and to make the executable code efficient, when the data processing system that is to be used to run the executable code is changed, the computer program is recompiled with a re-compiler.

A technical problem with this approach is that the compiler used for recompiling the computer program may also have changed to take advantage of hardware and other changes in the data processing system that is now being used. Further, the programming language being used, such as COBOL language, can have instances of undefined behavior. For example, particularly with a language like COBOL, datatypes that are used in one version of a compiler can have ill-formed data that does not conform to the specification of the same datatypes in another version. Further, the issue is that any observable problems due to this ill formed data can be inadvertently hidden/masked due to the particular low level code generation choices by the older compiler versions. When a new compiler version generates code that assumes the specification is being followed then these problems due to the ill formed data come to the surface.

It should be noted that this may not be a problem with languages where binary values are used such that every bit pattern corresponds to a value. For example, common data types used in COBOL include the "packed decimal" and the "zoned decimal" types. These Binary Coded Decimal (BCD) types have a range of invalid encodings. The specific program behavior for an invalid encoding is not explicitly defined by the language and is a product of the specific invalid encoding and the exact machine instruction sequence generated by the compiler that operates on this invalid data. In the present description embodiments of the present invention will be described with reference to the COBOL language, however, the embodiments of the present invention are applicable with other programming languages as well.

In the case of COBOL, because of such undefined behavior with datatypes, recompiling a program with a newer compiler is riskier than most languages. The result of undefined behavior is unpredictable and may vary from compiler to compiler, or between compiler-optimization levels within the same compiler. Recompiling a program containing undefined behavior can produce executable code that results in different execution than old executable code produced by an older compiler (or even the same compiler but when run in a different environment or when different compiler options such as the compiler-optimization level, or any other compiler option are used). As typical examples of possible ill formed data in languages like COBOL, consider source code in which the upper four bits of each byte in zoned decimal data items are not properly initialized. According to the language specification these four bits should be 0xF and for signed items the four bits in least significant byte should be a valid sign code 0xA→0xF. Another possibility includes improperly setting the sign code in packed or zoned decimal data items. Another potential problem arises from COBOL's binary two's complement data items being declared with a specified number of decimal digits. Therefore it is possible, on purpose or inadvertently, to 'over-populate' a binary item by including more binary bits then can actually be represented by the declared number of decimal digits. Another example is not clearing (or inadvertently setting) the upper four bits of the most significant byte in an even packed decimal data item. Even precision packed decimal items only require half the most significant byte to represent all their digits and so the upper four bits of this byte are supposed to be set to zero according to the language specification. Various other examples are possible.

To address such technical problems a binary to binary optimization tool, referred herein as a binary optimizer is used, which may also be referred to as a binary translator. The binary optimizer converts old binary modules in the compiled executable code (with old versions/older optimization levels) into another form and optimizes the binary modules from that form using different (e.g. newer) compiler technology. It should be noted that "conversion" in this case does not refer to turning the binary code back into source code. Rather, a binary translator or binary optimizer deconstructs and analyzes the original binary code (from older versions and/or lower optimization levels), in order to convert it into an intermediate language (IL) representation of the program, thus in order to optimize and then generate new binary modules using new optimization and compilation technology. Because the binary optimizer uses the compiled binary executable code as an input, it is assumed that the optimized version has the same behavior even in cases of undefined behavior. However, this approach is limited to older versions of compilers. Newer versions of the compiler use more aggressive optimizations, making it prohibitively difficult to analyze the binary.

For example, consider generation of specialized inline expansions of high level constructs. A "high level construct" is a statement or instruction in a high level language or in a machine language such as the z/Architecture instruction set, that is complex enough that its executable representation would be a complex code sequence of a plurality of low level machine instructions. Examples of high level constructs are: INSPECT in the COBOL language, and ED, EDMK in the z/Architecture instruction set. In several cases, newer versions of COBOL compiler generates specialized code sequences to represent high level constructs instead of handling in a more general, but less efficient way, with a runtime library call or slower instruction sequence. For example, in COBOL an "INSPECT" statement can search and transform strings. In earlier versions of COBOL, non-trivial INSPECT statements were normally performed by calling out to a COBOL runtime routine. In newer versions, faster implementations are generated inline in the binary executable code itself. Unlike the runtime routine, which had to handle every possible version of INSPECT, the inline copies can be specialized for the specific version that has to be executed. Similarly, conversions from numeric-edited to numeric data types can be done faster with specialized code sequences than with general hardware instructions ED and EDMK that were previously used. ED and EDMK instructions take a pattern as an input, and must handle any possible pattern. It is faster to generate a sequence that is specialized for the specific pattern that will be used in the executable code.

During compilation by newer, more efficient compilers, such operations corresponding to the high level constructs are typically represented at a high level while compiler-optimizing the program, and only converted into a low-level specialized sequence during code generation. This allows compiler-optimizations to take advantage of information about the semantics of the high level construct.

The code sequences generated for these high level constructs can vary significantly, depending on the details of the high level construct. Identifying the scope and purpose of such a code sequence based solely on the compiled binary is a prohibitively difficult technical problem. State of the art binary optimizers are limited in ability to recover a corresponding IL representation. Such binary optimizers are able to convert code that is compiled with an older version of a compiler, where the first executable code can be easily converted into an IL representation, and where the compiler is not under active development. In such cases, the binary optimizer can optimize the high level construct, because the IL representation of the high level construct is easy to determine and is not subject to change. But this is not true for any compiler that is under development, and thus using new compiler-optimization technology. This can result in more or different types of these sequences being generated (even for existing high level constructs like INSPECT or numeric editing).

One or more embodiments of the present invention address such technical problems and facilitate code compiled by newer versions of the compiler to be optimized by a binary optimizer according to one or more embodiments of the present invention. It allows that binary optimizer to generate new, more efficient code sequences. It does this without requiring changes in binary optimizer every time the compiler is modified to generate a novel code sequence, and facilitating the binary optimizer to preserve the existing behavior.

Figure 4:
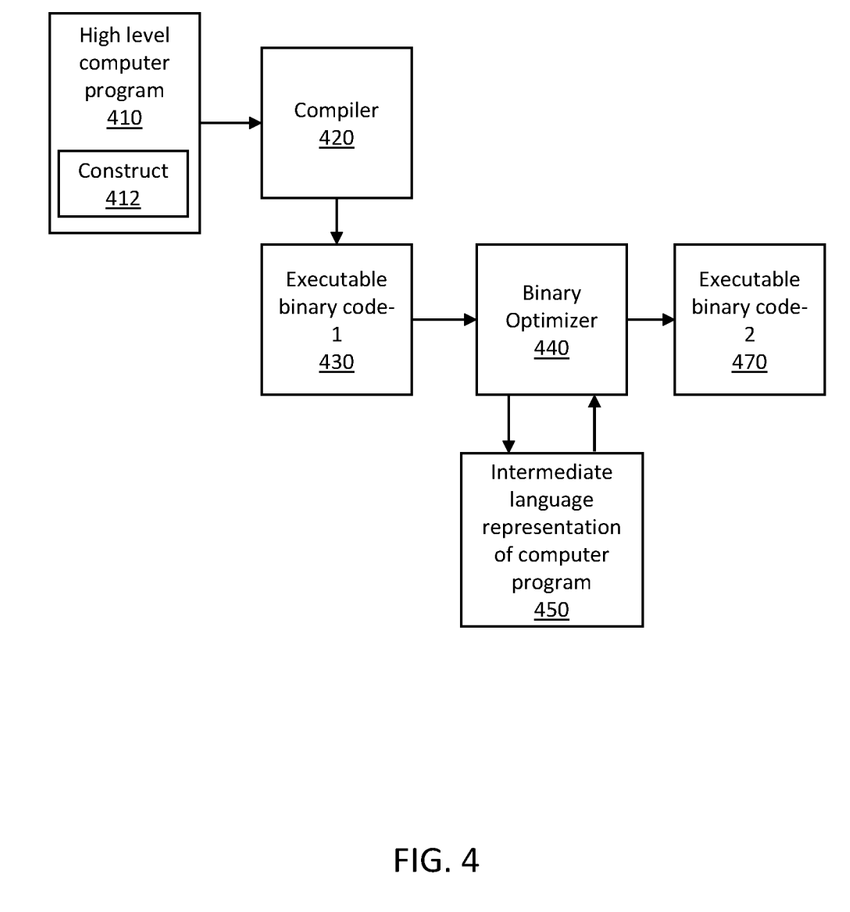
FIG. 4 depicts a block diagram of an optimization system according to one or more embodiments of the present invention.

FIG. 4 depicts a block diagram of an optimization system according to one or more embodiments of the present invention. As used herein, "compiling a computer program" includes generating, from a computer program in source language, a binary executable, i.e. machine instructions that can be executed by a processor. Also, as used herein, "optimizing an executable code" refers to optimizing a computer program from the binary executable by producing a new binary executable, which includes converting the first binary executable into an IL representation. It should be noted that an IL, as used herein, can be any language in which the program can be represented. For example, an IL can be an internal language, it could be the source language of the computer program, it could be the source language with internal annotations, it could be another binary language, or any other type of representation. All of these are examples of being intermediate between the first executable code and the second executable code, the second executable code being an optimization of the first executable code.

In the depicted scenario, a computer program 410 is compiled by a compiler 420 to generate a first binary executable code 430. The computer program 410 can include one or more high level constructs 412. It is understood that although only one construct 412 is illustrated, the program 410 can include one or more constructs 412.

A binary optimizer 440 is used when the code is to be optimized, for example, for new hardware. The binary optimizer 440 can perform conversion of the executable code 430, and further perform optimization and final code generation to generate a second executable code 470. It should be noted that in one or more examples, the binary optimizer 440 can be used for other possibilities, such as for producing an IL (or even source) representation of the first executable code 430, that representation being passed to a second compiler (not shown) for final code generation (or additional lower level optimizations). For example, the second compiler is a newer compiler than the compiler 420. Alternatively, the second compiler is an instance of the compiler 420 using different settings, such as optimization level being used.

The binary optimizer 440 receives the first executable code 430 as input and converts the executable code 430 to output an IL representation 450 of the computer program. The binary optimizer 440 then optimizes the IL representation 450 of the computer program to generate a second binary executable code 470. That is, the compiler 420 produces the first executable code 430 that can include additional compile-time information that will be described further and the binary optimizer 440 consumes the first executable code 430 and the compile-time information. Any compile-time information stored by the compiler 420 is for the purposes of optimization to produce the optimized second executable code 470.

As described earlier, with various versions of the compiler 420, particularly newer compiler technology, analyzing the first binary executable code 430 is technically challenging because of runtime directives that can make such analysis a moving target. Current state of the art binary optimizers cannot convert the binary executable code 430 into an IL representation 450, and as a consequence cannot convert the high level construct 412 from its executable representation that the compiler 420 typically generates.

To solve this technical problem and make it possible to use the binary optimizer 440 on programs compiled with such (e.g. newer) compilers, one or more embodiments of the present invention, as mentioned earlier, facilitate including additional compile-time information in the compiled binary executable code 430. This added information can be used to communicate information about the meaning of the program 410.

In one or more embodiments of the present invention the compiler 420 includes, in the first executable code 430, compile-time information about each high level construct 412 in the program 410 to allow the binary optimizer 440 to convert that construct 412 into an IL representation of it that is included in the IL representation 450 of the program, optimize the IL representation of the high level construct, and generate a new instruction sequence for the high level construct to be potentially included in the second executable code 470.

Because of the optimization it is possible that the newly optimized instructions do not have the same behavior as the old instructions on some inputs. To address this, one or more embodiments of the present invention use test vectors: a set of automatically generated inputs to compare the behavior of the new and old instruction sequences that are generated for the high level construct. If the two sequences give the same output for every input in the test vector, then it is deemed that it is safe to include the new instructions for the high level construct in the second executable code 470. Further, because the behavior of the new instruction sequence is compared to the old sequence during optimization, the optimized code (470), with respect to the high level construct preserves bug-for-bug compatibility.

Figure 5:
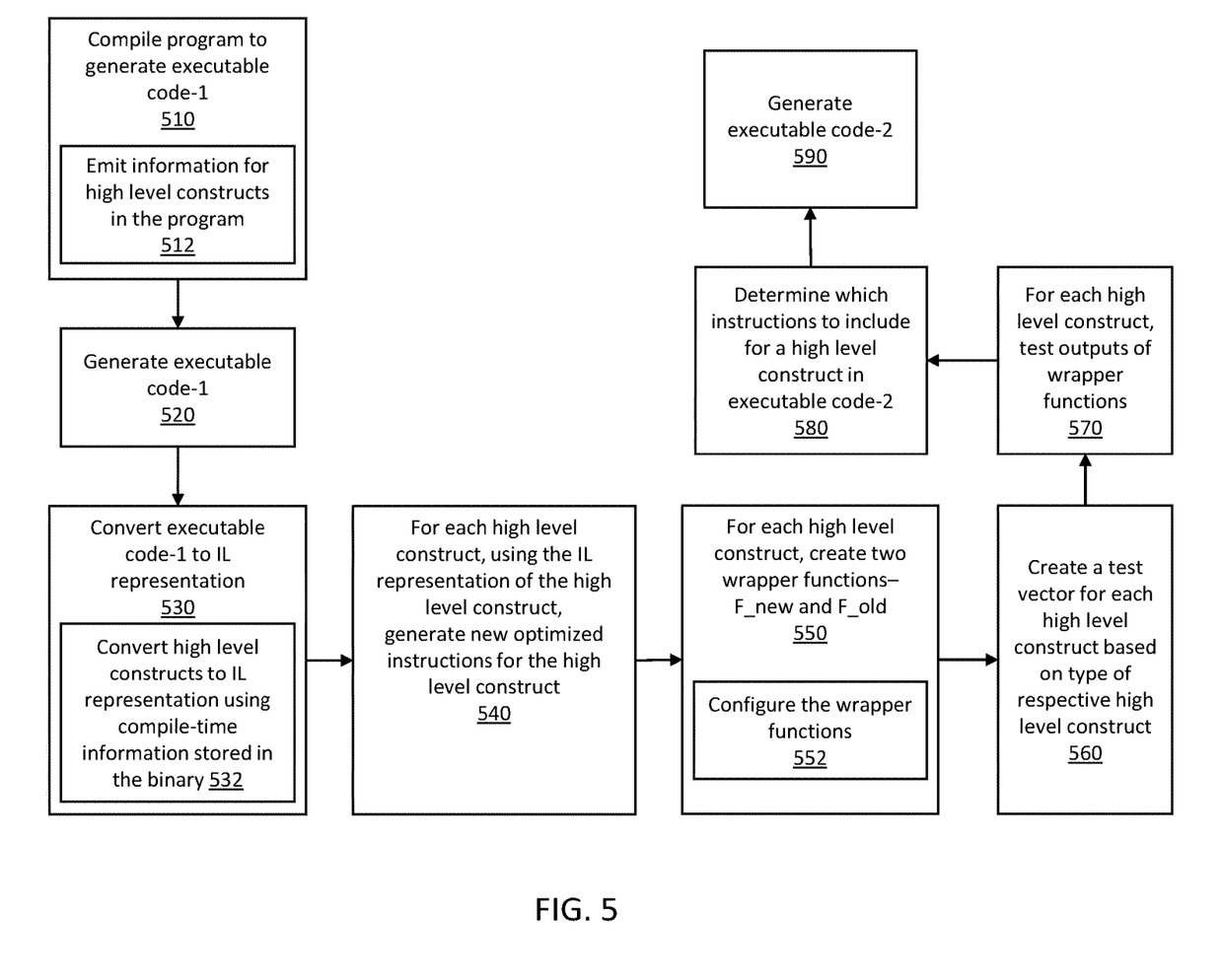
FIG. 5 depicts a flowchart of a method to automatically verify optimization of high level constructs using test vectors according to one or more embodiments of the present invention.

FIG. 5 depicts a flowchart of a method to automatically verify optimization of high level constructs using test vectors according to one or more embodiments of the present invention. The method includes compiling the program 410 using the compiler 420, at 510. The compilation includes emitting compile-time information about each inline expansion of a high level construct 412 in the program 410, at 512. The information includes an identifier of the high level construct 412 being expanded. For example, "edit-and-mark" or "inspect tallying". The information further includes location(s) of the set of instructions generated by the inline expansion in the first executable code 430. Because of optimizations like instruction scheduling that are performed by the compiler 420, these instructions may not form a contiguous range.

The compile-time information further includes, for each input to the high level construct 412, information about where the input is found. For example, a value being input into an edit-and-mark operation could be in a register or in memory. The information further includes, for each output of the high level construct, information about where the output is placed, such as in registers or in memory. The memory and/or register where the input/output is read from/written into are identified using a memory address or a register address respectively. The information is stored in the executable binary code 430.

The first executable code 430 is generated using the compiler 420 and may be used for execution until it is decided that the code is to be optimized using the binary optimizer 440, at 520. For example, the code is decided to be optimized once a newer binary optimizer, or newer hardware is available, although, the optimization may be performed for several other reasons. The binary optimizer 440 converts the first executable code 430 into an IL representation 450 of the program, at 530. During the conversion, using the emitted compile-time information that is stored in the executable binary code 430, the binary optimizer 440 generates the high level construct 412 in an IL representation of it, at 532.

The machine instructions that were generated for the high level construct 412 are not explicitly represented in the IL representation 450. The default behavior of the binary optimizer 440 is typically to represent every original input machine instruction as a corresponding structure in the IL representation 450 for it to be optimized. However, for the higher level constructs (like inspect and numeric editing) being discussed herein, this way of generating the IL representation 450 of the high level construct is to be prevented. Representing in this way can make it very difficult or impossible for the binary optimizer 440 to determine the overall higher level operation being done across a range of these input instructions. Hence, when information about such higher level operations across a range of input instructions are present in the binary 430, the binary optimizer 440 selects a similarly high level IL representation to encapsulate the higher level operation being done.

Further, for optimization of the program 410, the binary optimizer 440 is used to generate new optimized instructions for the high level construct 412 from the IL representation 450 of the high level construct 412, at 540. The new instructions are to be compared to the instructions that were generated by the compiler 420.

At this point, for each high level construct 412, the following information is available based on the compile-time information in the first binary executable code 430, and on information from completing step 540. The compile-time information includes the identity of the high level construct 412, the location(s) of the old instructions generated by the compiler 420 for the high level construct 412, and the location(s) of the inputs and outputs for the old instructions per the compiler 420; the information from completing step 540 includes the new instructions generated by the binary optimizer 440 for the high level construct 412 and the location(s) of the inputs and outputs for the new instructions per the binary optimizer 440.

The method further includes using the compile-time information to generate, for each high level construct 412, two wrapper functions, say F_new and F_old, at 550. It is understood that "F_new" and "F_old" are example names, and that other names/identities can be used in other examples. Creating the wrapper functions includes configuring input and output parameters, and instructions that are part of the wrapper functions, at 552. The inputs to the functions are the inputs to the high level construct 412. The return values of these functions are the outputs of the high level construct 412. Internally, each function is implemented as a copy of the old instructions for F_old and new instructions for F_new, the old instructions being those per the compiler 420, and the new instructions being those per the binary optimizer 440, respectively.

Further, for each type of high level construct 412, a procedure is defined to create a test vector, at 560. A test vector is a list of tests that compare the behavior of the code sequences generated by the compiler 420 and the binary optimizer 440. The test vectors include both valid and invalid inputs to the high level constructs. The test vectors can be optionally constrained to omit certain invalid inputs if the binary optimizer 440 provides (by looking at preceding operations) that the invalid input cannot reach this point. The test vector can include a predetermined set of tests based on the type of the high level construct 512, where the type of the high level construct 412 is determined based on the identity from the compile-time information.

For each test in the test vector, the F_new and F_old wrapper functions are executed and corresponding outputs are collected, at 570. The outputs from the two wrapper functions are compared to determine which instructions to include for the high level construct 412 in the second executable code 470, at 580. According to one or more embodiments of the present invention the execution of F_new and F_old is wrapped in an exception handler for collecting the outputs. An invalid input to the wrapper functions can cause a hardware exception. This is acceptable, so long as the old instructions and the new instructions cause the same hardware exception. The test vector is used to ensure that the behavior of the old instructions and the new instructions is substantially identical.

Based on a comparison of the outputs of the tests for the high level construct 412, which instructions to include for that high level construct 412 in the second executable code 470 is determined. Further in the method, if the outputs do not match, even if a single output from the test vector does not match, the instructions for the high level construct 412 that are to be included in the second binary executable code 470 are determined, at 580. If the new instructions and the old instructions do not provide the same output, there are several options. Which one of these options is selected from these options is based on several factors as described further. Once the instructions for each high level construct based on this selection match in behavior with the corresponding instructions for the high level construct in the first executable program 430, the binary optimizer 440 generates and emits the second executable program 470 including the corresponding instructions for each selected high level construct at 590.

Figure 6:
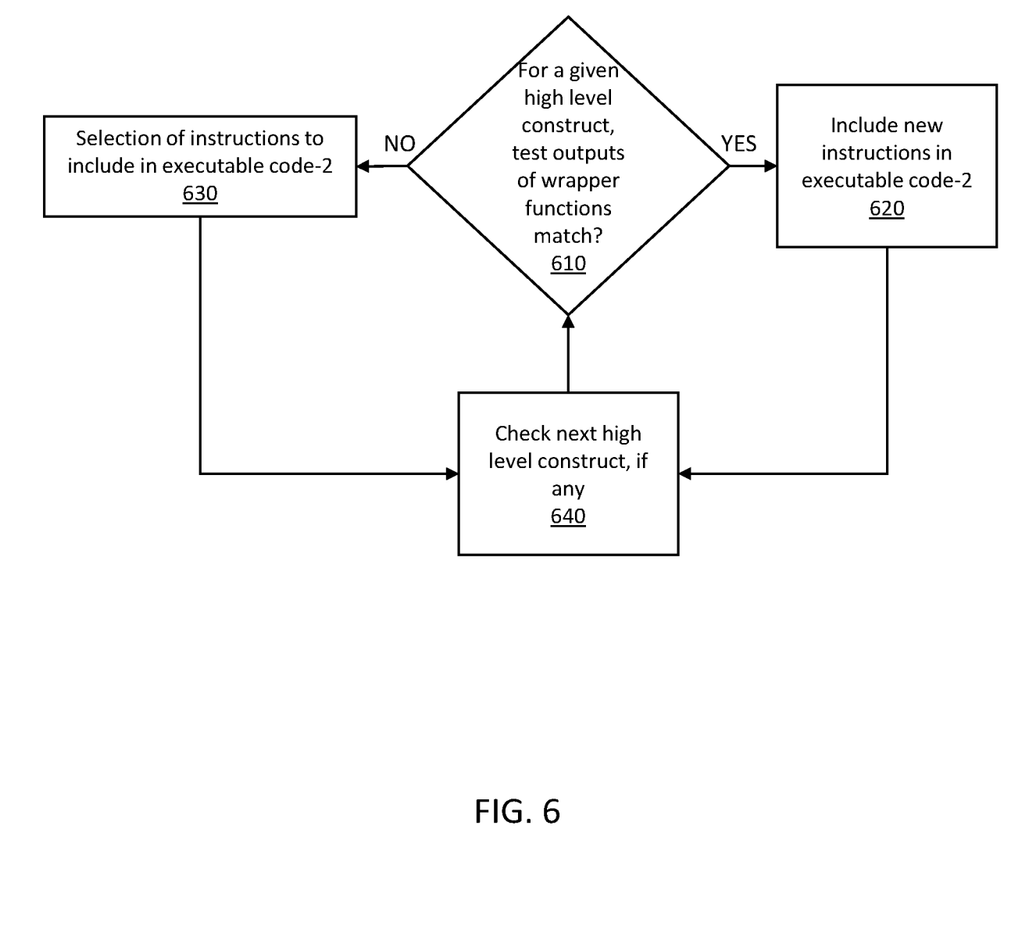
FIG. 6 depicts a flowchart of a method for determining which executable code to include in the second executable program according to one or more embodiments of the present invention.

FIG. 6 depicts a flowchart of a method for determining which instructions for the high level construct 412 to include in the second executable program 470 according to one or more embodiments of the present invention. If F_new and F_old give the same output for every input in the test vector at 610, then the new instructions are included in the second binary executable program 470, at 620.

In one or more embodiments of the present invention, if the new instructions for the high level construct 412 do not match the behavior of the old instructions, a user may be prompted for selecting which instructions to include in the second executable program 470, at 630. According to one or more embodiments of the present invention an option for selecting which instructions to include in the second executable program 470 if such a case arises is set for the optimizer 440 before it is run. Alternatively, or in addition, in one or more embodiments of the present invention, if the new instructions for the high level construct 412 for which the test results do not match the original instructions from the compiler 420 are emitted into the second executable code, at 630. This may be the default behavior of the selection performed, at 630. In one or more examples, the tests from the test vector are executed again to ensure that the behaviors match.

Alternatively, or in addition, the selection is facilitated on the basis of performance gain from the new instructions. For example, if the expected performance gain from the new code sequence of the high level construct 412 is sufficiently large, compared to that of the old code sequence, the user may select a more aggressive option. Here, sufficiently large performance gain can be determined based on execution time, computer resource usage, or any other metrics. If the comparison of such metrics for the old code and the new code results in at least a predetermined threshold improvement, the new code may be deemed to have a sufficiently large performance gain. For example, in terms of execution time, if the execution time improves by at least 10%, 25%, 50%, or any other such ratio (or other type of threshold) the new code may be deemed to have a sufficiently large performance gain, and the new code (even with different behavior) may be selected by the user.

Alternatively, or in addition, if the new code sequence only gives a different result on (certain types of) invalid data, and the cost of a runtime test to detect (those types of) invalid data is smaller than the performance improvement from the new code sequence, then the binary optimizer 440 can generate a new (third) binary executable code that includes both the old and the new code sequences, guarded by the runtime test. If the test passes, the new code sequence is used. If the test fails, the old code sequence is used. This provides an overall performance improvement, while still guaranteeing identical results.

Further, in one or more embodiments of the present invention, instead of using the test vector, the matching of the new code for the high level construct 412 and the old code for that high level construct 412 is determined using a Boolean satisfiability (SAT) solver, or other such tool. Because the matching test is performed as part of the optimization by the binary optimizer 440, and because SAT solver can require substantial time, the optimization using the binary optimizer 440 can be considered to be too long compared to the use of the test vector as described above.

Further yet, in one or more examples, if the compile-time information is not present for some reason in the first executable code 430 then another tool (such as a true decompiler (not shown) that converts the first executable code 430 back to source) or the binary optimizer 440 can analyze and discover the higher level operations and then proceed with the test vector approach described herein.

Accordingly, one or more embodiments of the present invention provide practical applications to improve optimization of statically compiled code for languages such as COBOL. The one or more embodiments of the present invention accordingly provide an improvement to computing technology, particularly compilers and optimizers. One or more embodiments of the present invention facilitate verification of optimization of high level constructs using test vectors.

For example, the verification includes compiling a program using a smart-binary-enabled compiler. The "smart-binary enabled" compiler emits and stores information about each inline expansion including a high level construct being expanded in the binary code being generated. The information that is stored includes identification of a set of instructions generated by the inline expansion. The information further includes, for each input to a high level construct, information about where one or more input parameters that are to be input are located. For example, a location of an input parameter can be provided as a location address in memory, a location in a file, or any other such reference. The information further includes, for each output of the high level construct, information about where the output is placed. For example, a location of the output can be provided as a location address in memory, a location in a file, or any other such reference, where one or more output parameters are stored.

Optimizing the program that includes the generated code (old instructions) by an optimizer (such as binary optimizer) includes converting the generated (binary) code into an IL representation. The generated code can include one or more instructions for a high level construct used in the source code of the program. Further, in response to the program being optimized, another binary executable code (new instructions) is generated, which can include a revised set of instructions for the high level construct. In one or more examples, compile-time information includes an identity of the high level construct, location(s) of the old instructions, the location(s) of the inputs and outputs for old instructions.

The verification further includes creating wrapper functions of F_new and F_old by the computer for each high level construct, wherein inputs to these functions are the inputs to the high level construct and return values of these functions are the outputs of the high level construct. In one or more embodiments of the present invention a procedure is generated to create a test vector comprising a list of tests designed to compare behavior of the old instructions and the new instructions, wherein the test vector includes valid and invalid inputs. Each of the F_new and F_old functions are executed for each test in the test vector to collect respective outputs, wherein testing takes place as part of the optimization of the program. In response to a determination by the computer that the F_new and F_old functions give a same output for every input in the test vector, an indication is provided that use of the new instructions in the optimized program is safe (i.e. matches old behavior). In response to a determination by the computer that the F_new and F_old functions do not give the same output for every input in the test vector, the computer can facilitate a selection from a set of predetermined options.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatic verification of optimization of high level constructs, the method comprising:
generating, by a compiler, a first executable code by compiling a computer program, the computer program including a high level construct, and the compiling comprising:
generating a first set of machine instructions for the high level construct; and
storing, in the first executable code, compile-time information for the high level construct; and
optimizing, by a binary optimizer, the first executable code, the optimizing comprising:
converting the first executable code into an intermediate language (IL) representation of the computer program, the IL representation comprising a set of IL instructions corresponding to the high level construct based on the compile-time information; and
generating a second executable code based on the IL representation of the computer program, wherein generating the second executable code comprises:
generating a second set of machine instructions for the high level construct based on the IL representation of the high level construct;
based on a determination that the first set of machine instructions and the second set of machine instructions match in behavior, including the second set of machine instructions in the second executable code, and
based on a determination that the first set of machine instructions and the second set of machine instructions do not match in behavior, including the first set of machine instructions in the second executable code.

2. The computer-implemented method of claim 1, wherein the determination that the first set of machine instructions and the second set of machine instructions match in behavior is based on a satisfiability solver.

3. The computer-implemented method of claim 1, wherein determining that the first set of machine instructions and the second set of machine instructions match in behavior comprises:
generating a test vector that comprises a plurality of tests;
executing each test in the test vector for the first set of machine instructions and the second set of machine instructions associated with the high level construct; and
comparing outputs of the each test in the test vector, wherein the behavior is determined to match based on each of the outputs matching for the first set of machine instructions and the second set of machine instructions.

4. The computer-implemented method of claim 3, wherein executing a test in the test vector comprises:
creating a first wrapper function for the first set of machine instructions;
executing the first wrapper function with inputs according to the test to be executed, and collecting a first set of outputs;
creating a second wrapper function for the second set of machine instructions; and
executing the second wrapper function with the inputs according to the test to be executed, and collecting a second set of outputs.

5. The computer-implemented method of claim 4, wherein the first wrapper function is enclosed in a first exception handler, and the second wrapper function is enclosed in a second exception handler.

6. The computer-implemented method of claim 3, wherein the behavior is determined to match based on a first output of a test being an exception for the first set of machine instructions and a second output of said test being said exception for the second set of machine instructions.

7. The computer-implemented method of claim 1, wherein the compile-time information comprises an identity of the high level construct, location(s) of the first set of machine instructions, location(s) of inputs and outputs for the first set of machine instructions.

8. The computer-implemented method of claim 1, wherein the compiler is a first instance of a compiler and a second instance of said compiler with different settings from those of the first instance of the compiler is used for generating the second executable code.

9. A system comprising:
a memory; and
a processor coupled with the memory, the processor configured to execute a method for automatic verification of optimization of high level constructs, the method comprising:
generating, by a compiler, a first executable code by compiling a computer program, the computer program including a high level construct, and the compiling comprising:
generating a first set of machine instructions for the high level construct; and
storing, in the first executable code, compile-time information for the high level construct; and
optimizing, by binary optimizer, the first executable code, the optimizing comprising:
converting the first executable code into an intermediate language (IL) representation, the IL representation comprising a set of IL instructions corresponding to the high level construct based on the compile-time information;
generating a second executable code based on the IL representation, the second executable code comprising a second set of machine instructions for the high level construct;
comparing, by the binary optimizer, the first set of machine instructions and the second set of machine instructions; and
based on a determination that the first set of machine instructions and the second set of machine instructions match in behavior, replacing the first executable code with the second executable code.

10. The system of claim 9, wherein the determination that the first set of machine instructions and the second set of machine instructions match in the behavior is based on a satisfiability solver.

11. The system of claim 9, wherein determining that the first set of machine instructions and the second set of machine instructions match in behavior comprises:
generating a test vector that comprises a plurality of tests;

executing each test in the test vector for the first set of machine instructions and the second set of machine instructions associated with the high level construct; and comparing outputs of the each test in the test vector, wherein the behavior is determined to match based on each of the outputs matching for the first set of machine instructions and the second set of machine instructions.

12. The system of claim 11, wherein executing a test in the test vector comprises:

creating a first wrapper function for the first set of machine instructions;

executing the first wrapper function with inputs according to the test to be executed, and collecting a first set of outputs;

creating a second wrapper function for the second set of machine instructions; and executing the second wrapper function with the inputs according to the test to be executed, and collecting a second set of outputs.

13. The system of claim 12, wherein the first wrapper function is enclosed in a first exception handler, and the second wrapper function is enclosed in a second exception handler.

14. The system of claim 11, wherein the behavior is determined to match based on a first output of a test being an exception for the first set of machine instructions and a second output of said test being said exception for the second set of machine instructions.

15. The system of claim 9, wherein the compile-time information comprises an identity of the high level construct, location(s) of the first set of machine instructions, location(s) of inputs and outputs for the first set of machine instructions.

16. The system of claim 9, wherein the compiler is a first instance of a compiler and a second instance of said compiler with different settings from those of the first instance of the compiler is used for generating the second executable code.

17. A computer program product comprising a computer readable storage medium having program instructions embodied therewith, the program instructions executable by a computer processor to cause the computer processor to perform a method for automatic verification of optimization of high level constructs, the method comprising:

generating, by a compiler, a first executable code by compiling a computer program, the computer program including a high level construct, and the compiling comprising:

generating a first set of machine instructions for the high level construct; and storing, in the first executable code, compile-time information for the high level construct; and optimizing, by a binary optimizer, the first executable code, the optimizing comprising:

converting the first executable code into an intermediate language (IL) representation of the computer program, the IL representation comprising a set of IL instructions corresponding to the high level construct based on the compile-time information; and generating a second executable code based on the IL representation of the computer program, wherein generating the second executable code comprises:

generating a second set of machine instructions for the high level construct based on the IL representation of the high level construct;

based on a determination that the first set of machine instructions and the second set of machine instructions match in behavior, including the second set of machine instructions in the second executable code, and based on a determination that the first set of machine instructions and the second set of machine instructions do not match in behavior, including the first set of machine instructions in the second executable code.

18. The computer program product of claim 17, wherein determining that the first set of machine instructions and the second set of machine instructions match in behavior comprises:

generating a test vector that comprises a plurality of tests;

executing each test in the test vector for the first set of machine instructions and the second set of machine instructions associated with the high level construct; and comparing outputs of the each test in the test vector, wherein the behavior is determined to match based on each of the outputs matching for the first set of machine instructions and the second set of machine instructions.

19. The computer program product of claim 18, wherein executing a test in the test vector comprises:

creating a first wrapper function for the first set of machine instructions;

executing the first wrapper function with inputs according to the test to be executed, and collecting a first set of outputs;

creating a second wrapper function for the second set of machine instructions; and executing the second wrapper function with the inputs according to the test to be executed, and collecting a second set of outputs.

20. The computer program product of claim 17, wherein based on a determination that the first set of instructions and the second set of instructions do not match in the behavior:

determining a performance gain of the second set of instructions over the first set of machine instructions;

in response to the performance gain being below a predetermined threshold, using the first set of instructions; and in response to the performance gain at least exceeding the predetermined threshold, using the second set of instructions code.

21. A computer-implemented method for automatic verification of optimization of high level constructs, the method comprising:

generating, by a compiler, a first executable code by compiling a computer program, the computer program including a high level construct, and the compiling comprising:

generating a first set of machine instructions for the high level construct; and storing, in the first executable code, compile-time information for the high level construct; and optimizing, by an optimizer, the first executable code, the optimizing comprising:

converting the first executable code into an intermediate language (IL) representation, the IL representation comprising a set of IL instructions corresponding to the high level construct based on the compile-time information;

generating a second executable code based on the IL representation, the second executable code comprising a second set of machine instructions for the high level construct; and based on a determination that the first set of machine instructions and the second set of machine instructions do not match in behavior for a set of inputs:

generating a third executable code that includes the first set of machine instruction, the second set of machine instructions, and an added function that checks an input to the high level construct, and in response to the input being from a predetermined set of inputs, causes execution of the first set of machine instructions, and causes execution of the second set of machine instructions otherwise.

22. The computer-implemented method of claim 21, wherein determining that the first set of machine instructions and the second set of machine instructions match in behavior comprises:

generating a test vector that comprises a plurality of tests;

executing each test in the test vector for the first set of machine instructions and the second set of machine instructions associated with the high level construct; and comparing outputs of the each test in the test vector, wherein the behavior is determined to match based on each of the outputs matching for the first set of machine instructions and the second set of machine instructions.

23. The computer-implemented method of claim 22, wherein executing a test in the test vector comprises:

creating a first wrapper function for the first set of machine instructions;

executing the first wrapper function with inputs according to the test to be executed, and collecting a first set of outputs;

creating a second wrapper function for the second set of machine instructions; and executing the second wrapper function with the inputs according to the test to be executed, and collecting a second set of outputs.

24. A system comprising:

a memory; and a processor coupled with the memory, the processor configured to perform a method for automatic verification of optimization of high level constructs, the method comprising:

generating, by a compiler, a first executable code by compiling a computer program, the computer program including a high level construct, and the compiling comprising:

generating a first set of machine instructions for the high level construct; and storing, in the first executable code, compile-time information for the high level construct; and optimizing, by an optimizer, the first executable code, the optimizing comprising:

converting the first executable code into an intermediate language (IL) representation, the IL representation comprising a set of IL instructions corresponding to the high level construct based on the compile-time information;

generating a second executable code based on the IL representation, the second executable code comprising a second set of machine instructions for the high level construct; and based on a determination that the first set of machine instructions and the second set of machine instructions do not match in behavior for a set of inputs:

generating a third executable code that includes the first set of machine instruction, the second set of machine instructions, and an added function that checks an input to the high level construct, and in response to the input being from a predetermined set of inputs, causes execution of the first set of machine instructions, and causes execution of the second set of machine instructions otherwise.

25. The system of claim 24, wherein determining that the first set of machine instructions and the second set of machine instructions match in behavior comprises:

generating a test vector that comprises a plurality of tests;

executing each test in the test vector for the first set of machine instructions and the second set of machine instructions associated with the high level construct; and comparing outputs of the each test in the test vector, wherein the behavior is determined to match based on each of the outputs matching for the first set of machine instructions and the second set of machine instructions.

* * * * *